(No Model.)

E. H. BROWNELL.
RIDING ROLLER PLOW OR HARROW.

No. 288,542. Patented Nov. 13, 1883.

WITNESSES.
W. A. Jones
Franck O. Johns

INVENTOR.
Elijah H. Brownell
per H. W. Cragin, Asso. Atty.

UNITED STATES PATENT OFFICE.

ELIJAH H. BROWNELL, OF DAYTON, OHIO.

RIDING ROLLER PLOW OR HARROW.

SPECIFICATION forming part of Letters Patent No. 288,542, dated November 13, 1883.

Application filed July 5, 1883. (No model.)

*To all whom it may concern:*

Be it known that I, ELIJAH H. BROWNELL, a citizen of the United States, residing at Dayton, in the county of Montgomery and State of Ohio, have invented certain new and useful Improvements in Riding Roller Plows or Harrows; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to provide a riding roller plow or harrow which shall be advantageous in operation, cheap, and durable.

My invention consists in a peculiar arrangement of the rollers and plows and means for raising and lowering the latter, said plows being securely locked when off the ground, but readily falling again by gravity when the locking device is released, all of which will be fully described below and pointed out in the claim.

In the accompanying drawings, Figure I is a plan view. Fig. II is an end view. Fig. III is a side elevation.

Like letters refer to like parts.

A A represent ordinary double rollers, of wood or boiler-iron, working midway between the sides of the frame-work O on shafting provided with boxing at either end.

B B are plows or harrow-teeth, provided on their front surface with sharp steel colters, and attached to the frame O, before and behind the rollers A A, by swing-bars G G, rods L, and chains S, fastened to the rollers or rock-shafts K K. Said rollers also work between the side pieces of the frame in shaft-bearings. The rollers are rocked to wind up the chains by the levers I I'. Rod J connects the two levers, and it will be seen how the driver can easily raise all the plows together from his seat by placing his hand on said rod. When so raised, notched bar E, actuated by spring F, catches and holds lever I', thus preventing the plows from falling back to operation. Said bar is provided with a lever, M, and when it is desirable to work the plows again the bar can be pushed aside against the spring. The plows will then fall to the earth by gravity.

The plows B B are provided with slotted ears for receiving bars G G. The latter are held therein by wooden pins, so that in case a substance liable to break plows is struck the pins will break and the plows be preserved. The plows are also arranged behind to receive a chain-link, and there are holes for pins or bolts.

Figure 1:
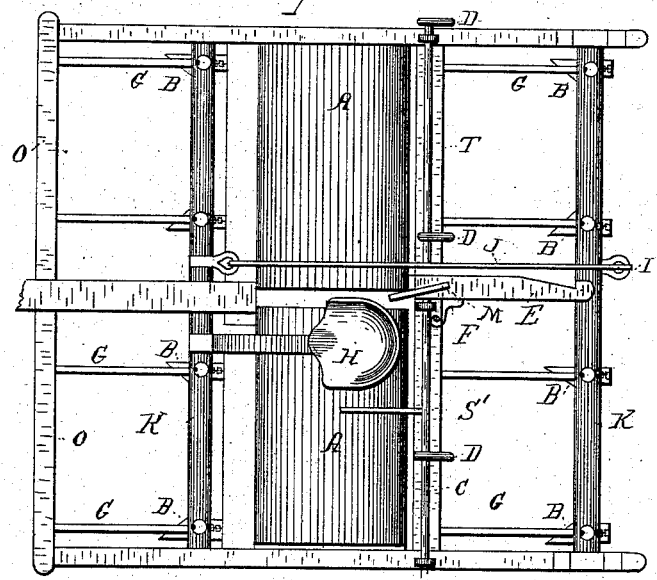
Figure 2:
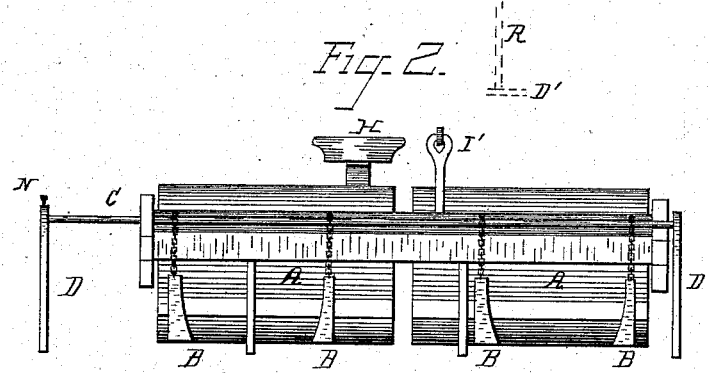
Figure 3:
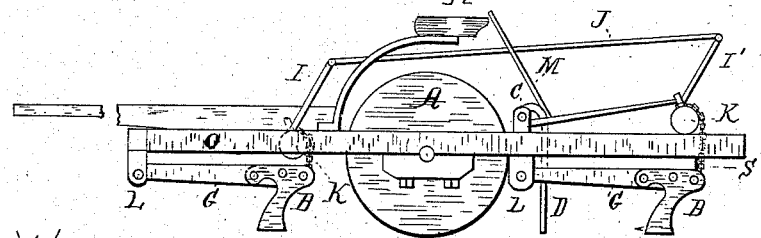

After the ground is prepared for seed, and especially where the marking of corn-rows is necessary, the plows may be raised, as above described, or removed entirely by taking rods L out and releasing the chains from the rollers. Rod C may then be run through eye-bolts in beam T, behind the rollers. On said rod are placed markers D D, each provided with a suitable fastening, such as the set-screw N. (See Fig. 2.) The markers are shown equidistant on the rod C, but may be arranged as desired. In turning at the end of the field, rod C is shifted and the markers D D raised by means of the lever S', and the row-markers D' (see dotted lines, Fig. 1) guide the eye in returning back over the field.

The roller-machine may be worked with the markers or plows suspended or removed, or in combination with either or both.

Having fully described my invention, what I claim, and desire to secure by Letters Patent, is—

In a riding roller plow or harrow, the combination, with a main frame having rollers journaled therein, and two series of plows, one located in front and the other in the rear of the rollers, each of said plows being secured to the rear ends of pivoted drag-bars, of the rock-shafts K K, provided with chains attached to the free ends of the drag-bars and to the said rock-shafts, the levers I I', connecting-rod J, notched bar E, lever M, and spring F, substantially as set forth.

ELIJAH H. BROWNELL.

Witnesses:
CHAS. W. FINCH,
CHARLES H. KAMLER.